H. A. HOKE.
VALVE.
APPLICATION FILED MAY 26, 1917.
1,290,558.
Patented Jan. 7, 1919.
2 SHEETS—SHEET 1.
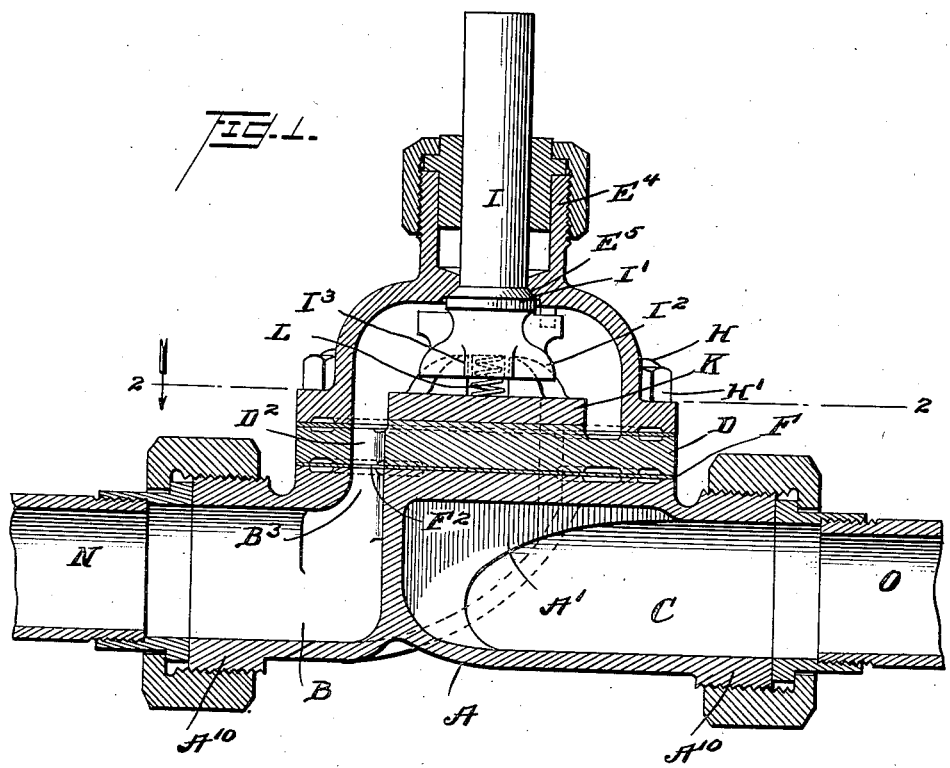
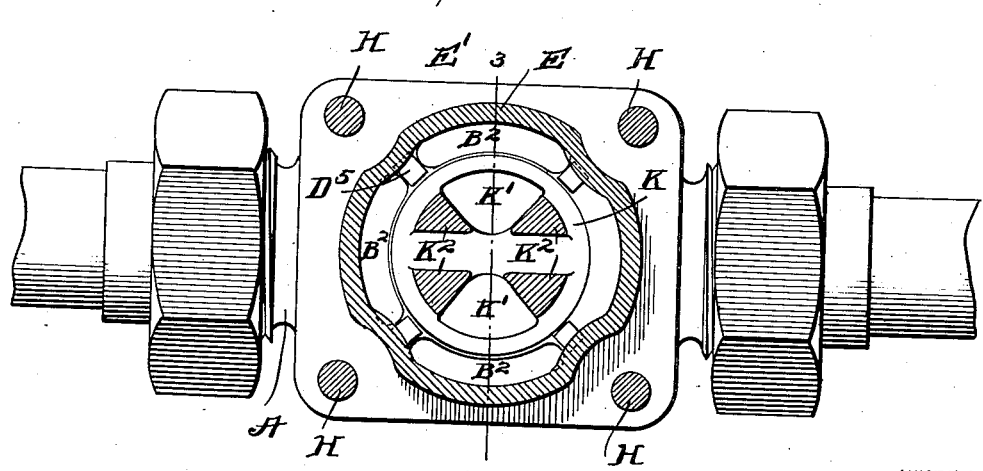
WITNESS:
INVENTOR
HIS ATT'Y

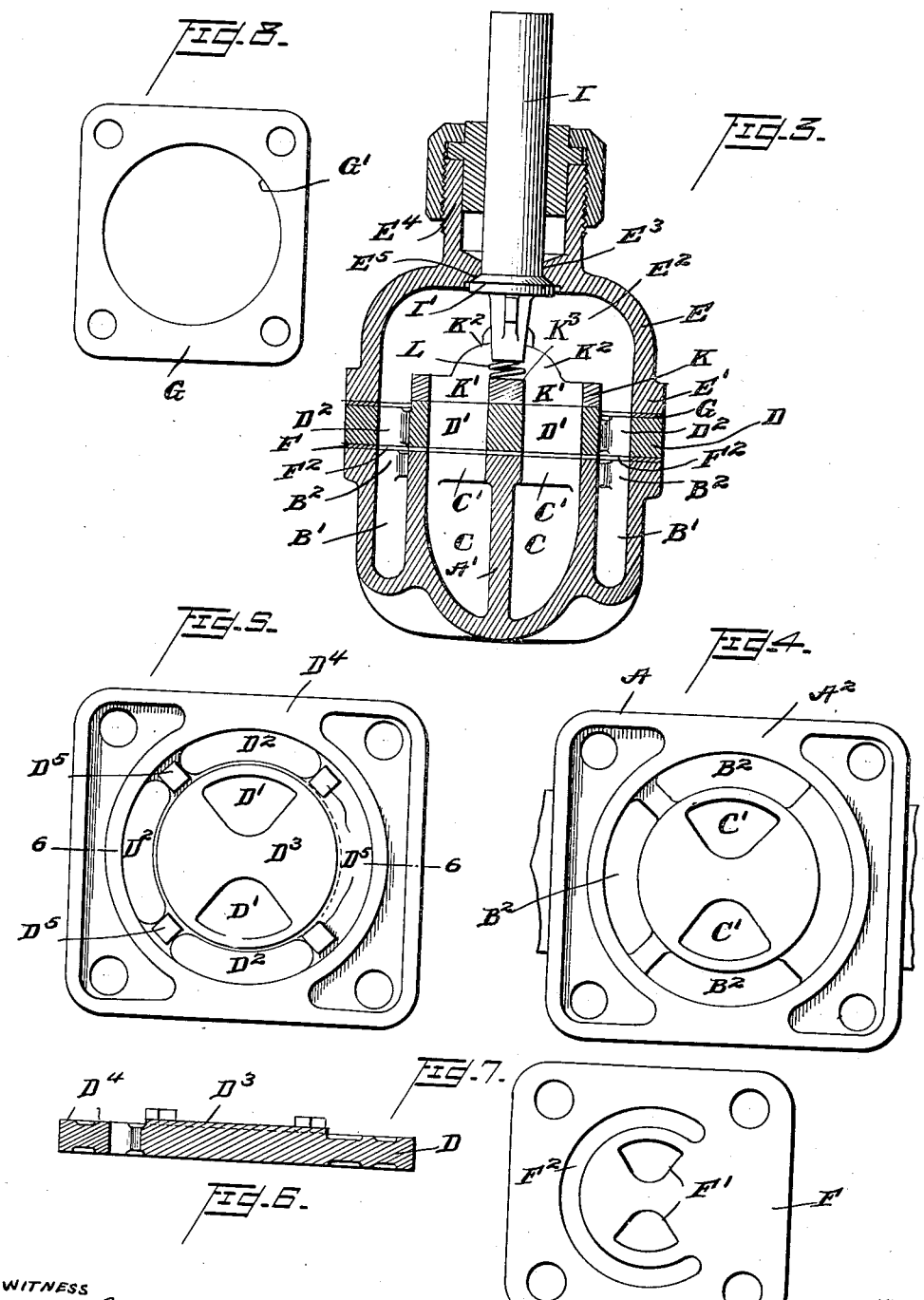

UNITED STATES PATENT OFFICE.

HARRY A. HOKE, OF ALTOONA, PENNSYLVANIA.

VALVE.

1,290,558.   Specification of Letters Patent.   Patented Jan. 7, 1919.

Application filed May 26, 1917.  Serial No. 171,297.

*To all whom it may concern:*

Be it known that I, HARRY A. HOKE, a citizen of the United States of America, residing in Altoona, in the county of Blair and State of Pennsylvania, have invented certain new and useful Improvements in Valves, of which the following is a true and exact description, reference being had to the accompanying drawings, which form a part thereof.

The object of my present invention is to provide a simple and effective valve especially devised and adapted for use as a locomotive blower valve, although not limited to such use.

More especially the object of my invention is to provide a valve of the rotary type characterized by the novel provisions made for removing the rotary valve member proper and the valve seat member for cleaning, inspection, regrinding or renewal, without requiring the valve casing or body to be disconnected from the piping with which it is connected.

The various features of novelty which characterize my invention are pointed out with particularity in the claims annexed to and forming a part of this specification. For a better understanding of the invention, however, and the advantages possessed by it reference should be had to the accompanying drawings and descriptive matter in which I have illustrated a preferred embodiment of my invention.

Of the drawings:

Figure 1 is a sectional elevation.

Fig. 2 is a plan partly in section on the line 2—2 of Fig. 1.

Fig. 3 is a section on the line 3—3 of Fig. 2.

Fig. 4 is a plan view of a portion of the casing body.

Fig. 5 is a plan view of the valve seat member.

Fig. 6 is an elevation in section on the line 6—6 of Fig. 5.

Fig. 7 is a plan view of one of the gaskets employed, and Fig. 8 is a plan view of another gasket employed.

In the particular embodiment of my invention shown in the drawings, A represents the casing body, which is formed with an inlet chamber B and an outlet chamber C. As shown, the pipe connections N and O to the chambers B and C are in alinement, and the connections are made by means of threaded couplings on alined tubular bosses $A^{10}$ formed on the casing body. At one side the casing body is formed with a flat face $A^2$, through which ports $B^2$ open into the chamber B and the extensions B' thereof, and ports C' open into the chamber C at opposite sides of the strengthening rib A', which projects into the chamber C from the flat side $A^2$ of the casing body. Fitting against the side $A^2$ of the casing body, and interposed between the latter and the casing bonnet member E, is a valve seat member D. The latter is formed with ports D' registering with the ports C', and with ports $D^2$ registering with the ports $B^2$. A gasket F of annealed copper, or other suitable material, is interposed between the valve seat member D and the surface $A^2$ of the casing body A, and a gasket G formed of similar material is interposed between the bonnet E and the valve seat member D. The parts A, F, D, G and E are normally secured together by stud bolts H, secured in the casing body A and passing through apertures provided for the purpose in the parts F, D and G and the flanged base E' of the member E. The gasket F is formed with ports F' registering with the ports D' and with an elongated arc shaped port $F^2$ with different portions of which the three ports $D^2$ register. The gasket G is formed with a central aperture G', the inner edge of which is flush with the inner wall of the dome shaped chamber $E^2$, formed in the bonnet E.

The member E is formed with an opening $E^3$, through which passes a valve operating member I, extending perpendicularly away from the center valve seat surface $D^3$ of the valve seat member D. The bonnet E is provided with an external tubular boss $E^4$ surrounding the opening $E^3$ and forming the shell of a stuffing box for preventing leakage out of the chamber $E^2$ along the valve member I.

At the margin of the inner end of the passage $E^3$ a conical seat $E^5$ is provided for a conical collar I' formed on the valve operating member I and serving to prevent outward movement of the member I. Within the chamber $E^2$ the valve member I is provided with a flattened portion $I^2$, which is received between the lugs $K^2$ formed on the adjacent side of the circular valve member K. The valve member K fits against the valve seat surface $D^3$ of the member D and is formed with ports K', which in one position of the valve register with the ports D' and C' and thus establish communication between the outlet chamber C and the bonnet chamber E² and thereby, through the continuously open ports D² and B³, with the inlet chamber B.

When the valve member is rotated from its open position through an angle of approximately 90° the valve member then closes the ports D' and thereby closes communication between the chamber C on the one hand and the bonnet chamber E² on the other hand. A spring L having one end bearing against the valve member K³, and the other end received in a socket formed on the adjacent end of the valve actuating member I acts between the member I and the valve member K to hold the latter snugly against its seat. To permit the valve K to fit properly against its seat at all times, the connection between the valve member and the valve operating member I is advantageously one permitting of a slight universal adjustment of the valve member relative to the operating member. The lateral, i. e. not rotative, movement of the valve member on its seat is limited by means of lugs D⁵ projecting from the member D at the periphery of the valve member K. Lugs I³ and E⁵ formed on the members I and E respectively, coact to prevent undesirable excess angular movement of the member I.

The construction described is relatively simple and easy to construct and the bonnet E, valve member K, and valve seat member D, may be easily and quickly removed to permit inspection, cleaning, regrinding or renewal of the valve seat member D and the valve K, and the valve then reassembled without disturbing the pipe connections to the valve casing body. To effect the removal of these members it is only necessary to remove the nuts H' on the outer ends of the stud bolts H. Any suitable operating handle, or handles, may be secured to the external end of the valve actuating member I.

While in accordance with the provisions of the statutes I have illustrated and described the best form of my invention now known to me it will be apparent to those skilled in the art that changes may be made in the form of the apparatus disclosed without departing from the spirit of the invention claimed herein.

Having now described my invention, what I claim now as new and desire to secure by Letters Patent, is:

1. A valve comprising a casing body formed with inlet and outlet chambers and with ports in its open side leading from said chambers in the same direction, with the ports from the inlet chamber at a greater distance from a common center than the ports from the outlet chamber, a chambered bonnet member inclosing said ports, a valve seat member interposed between the open side of the casing body and the bonnet member and having ports registering with the ports of the body member, the valve seat extending over the outlet ports only of the casing and seat member, and a rotary valve member seated on the valve seat and formed with ports which in one position open the outlet ports to the bonnet while in another position said valve closes said outlet ports.

2. A valve comprising a casing body formed with inlet and outlet chambers, and with the inlet chamber partly enveloping the outlet chamber, said casing having ports on its open side with the port from the inlet chamber partly surrounding the port to the outlet chamber, a valve seat member interposed between the open side of the casing body and the bonnet member and having ports registering with the ports of the body member, the valve seat extending over the outlet ports only of the casing and seat member, and a rotary valve member seated on the valve seat and formed with ports which in one position open the outlet ports to the bonnet while in another position said valve closes said outlet ports.

HARRY A. HOKE.